United States Patent Office 3,379,670
Patented Apr. 23, 1968

3,379,670
PROCESS FOR PREPARATION OF SPINNABLE SOLUTIONS OF ACRYLONITRILE POLYMERS OR COPOLYMERS HAVING A HIGH-ACRYLONITRILE CONTENT
Demetrio Corradi, Varedo, and Alberto Pasin, Cesano Maderno, Italy, assignors to Snia Viscosa Società Nazionale Industria Applicazioni Viscosa S.p.A., Milan, Italy, a company of Italy
No Drawing. Continuation-in-part of applications Ser. No. 456,832, May 18, 1965, and Ser. No. 457,174, May 19, 1965. This application Aug. 9, 1967, Ser. No. 659,330
Claims priority, application Italy, May 19, 1964, 11,062/64, Patent 778,106
9 Claims. (Cl. 260—32.6)

ABSTRACT OF THE DISCLOSURE

A spinnable solution of a polymer of acrylonitrile is produced by dissolving a monomeric mixture, containing acrylonitrile, in dimethylformamide with the monomers constituting between 50 and 60 percent by weight of the solution, heating the solution to between 60° and 65° C. under subatmospheric pressure, adding a peroxide catalyst, discontinuing the process when conversion of 30 to 40% of the monomers is attained. In a modification of the process, after the 30 to 40% conversion is attained, further dimethylformamide and catalyst are added, and the resulting mass is subjected to lower subatmospheric pressure and polymerization continued until conversion of 70 to 75% is achieved.

---

This application is a continuation-in-part of our prior application Ser. No. 456,832 and 457,174, filed May 18, 1965 and May 19, 1965, respectively, now abandoned.

This invention relates to an improved process for the preparation of spinnable solutions of polyacrylonitrile or of copolymers having a high content of acrylonitrile, more particularly higher than 85%. More specifically, the present invention relates to an improved process for the direct preparation, under controlled temperature conditions, of dimethylformamide solutions of acrylonitrile-based polymers or copolymers, said spinnable solutions affording quite particular advantages both from the point of view of the molecular weight of the copolymer and of the quality of the yarns which can be obtained, and especially of their whiteness rating.

The improved process according to the invention can be regarded, from a general standpoint, an integration and a development of known processes, such as the one disclosed in the Italian Patent 501,674. This patent claims the preparation of spinnable solutions by dissolution of the monomer in a solvent capable of dissolving also the relevant polymer, and the subsequent performance of the polymerization in the presence of a peroxide catalyst. According to that previous patent, acrylonitrile was directly polymerized within the solvent, which latter was indicated, in one of the examples of the said patent, to be dimethylformamide.

These known processes afforded advantages as compared with other processes wherein aqueous dispersions or emulsions of acrylonitrile were resorted to.

The possibility is also known of producing yarns having a polyacrylonitrile content higher than 85%, which yarns exhibit adequate textile and tinctorial properties obtained, for example, by employing basic dyestuffs. In such cases, however, acrylonitrile alone as such is not used, but rather ternary mixtures having a well-defined composition, consisting of acrylonitrile and esters of the acrylic and metacrylic acids along with sulphonic-moiety-containing vinyl monomers.

To the end of a better understanding of the basic principles of the present invention, reference is made first to the subject-matter of Example 3 of the aforementioned Italian Patent 501,674. In this Example 250 cc. of dimethylformamide are treated with 160 cc. of pure acrylonitrile, and into the mixture there is then dissolved 1 g. of the peroxide of 89% oleic acid. This mixture is poured into a glass tube fitted with stirrer and heated to 60° C.

After about 40–50 minutes there is noted an initial thickening of the mass, which indicates the start of polymerization. Afterwards, the mass is practically solid and the stirrer fails to move it. The excess of acrylonitrile is distilled under vacuum.

The mass contains 26% wt. of polyacrylonitrile and 74% of dimethylformamide. 60 grs. of solvent are added in order to bring the solution to 18–19% of polymer. In this way the mass fluidifies. After stirring for two hours in 99.9% nitrogen environment the solution is ready for spinning. The polymer and the yarns therefrom obtained show a pronounced improvement as regards darkening of the polymer and of the solution. The latter, in fact, is seen to be almost colourless and the yarns obtained are glossy and soft to the touch and do not require whitening treatment with hypochlorite. By cold spinning (20–26° C.) in an aqueous solution of dimethylformamide, there is coagulation of a filament that can be stretched without breakage up to 20 times its original length, at a temperature of 90–150° C. There are obtained filaments which, after washing for removal of all solvent residue, are seen to have excellent properties: 5.2 gr./den. per single strand and 25% of elongation.

According to such known procedures, if the conversion is continued and carried on beyond 60% approx. of the monomer, polymers are obtained having an average molecular weight not entirely suited for spinning and lower than 40,000. Furthermore, the polymer final solutions were somewhat dark and were conducive to the formation of yarns which did not have the most desirable whiteness of characteristics.

It is also known that for said polymerizations or copolymerizations a predetermined priming temperature, in the order of 60° C., is required for the reaction. The latter is highly exothermic and thus the temperature of the reaction mass tends to be increased. This phenomenon makes it awkward to check and limit the conversion of the monomer charged in the reactor, and consequently to obtain for the polymer the edsirable molecular weight which is suitable for spinning. The reaction run is thus not readily reproducible under predetermined conditions.

Moreover, whenever sodium-allyl-sulphate-containing copolymers are being prepared, the yarns obtained with the known processes do not possess perfectly constant textile and tinctorial properties, and more particularly the percentage of sodium allyl sulphonate, one of the sulphonate vinyl monomers which is most often used in order that the best tinctorial properties of the yarn may be achieved, varies in said yarns. This shortcoming originates from the fact that powdered, commercial-grade sodium allyl sulphonate is conventionally adopted, which, charged along with other necessary substances in the reactor, produces insoluble residues in the copolymer solutions thus obtained. Said solutions are muddy and difficulties arise in spinning, the yarns thus obtained having uneven percentages of sodium allyl sulphonate and non-uniform textile and tinctorial properties. It is known, in fact, that a percentage of sodium allyl sulphonate which is higher or lower than a certain critical range (which can be rated from 1.5% to 1.6%) gives rise to difficulties and noticeable differences in the dye-fixing capacity. More particularly, percentages which are lower than the critical one are conducive to a wholly insufficient dyeing. It has been ascertained that the employment of powdered, commercial-grade sodium allyl sulphonate, introduced in this form in the mass to be copolymerized, gives rise to variations in the contents of said salt, among the several lots, which can exceed 0.5%, while, in order to obtain the most desirable production evenness in yarns having the best and the most uniform tinctorial characteristics, it would be desirable that said variations should not go beyond 0.1%, with 0.2% as the allowable maximum rating.

According to the present invention, it has surprisingly been ascertained that, if the percentage of the monomers present in the mass is raised up to at least 50–60% and the conversion process is stopped at values in the order of 30–40% of converted polymer (in actual practice discontinuing the process run when the conversion has involved not more than one-third of the monomers present in the mass) polymers or copolymers are obtained whose average molecular weight is much higher than that of the polymers obtained according to the prior art, i.e. in the order of 60,000–65,000.

According to one modification of the invention, when 30 to 40% conversion is attained, further catalyst and further dimethylformamide are added to expedite further polymerization in a second stage. The further polymerization is then continued until a conversion not lower than 70% is attained.

When the spinnable solution consists of an acrylonitrile copolymer which contains sodium allyl sulphonate, according to a specific embodiment of the invention, clear and homogeneous spinnable solutions are obtained, from which yarns are produced having uniform textile and tinctorial characteristics. Thus obviously a remarkable improvement in the quality of the produced yarns is obtained.

Another notable improvement from a qualitative point of view is achieved in that, from polymers obtained by said interruption of the conversion, yarns are obtained which do not exhibit the aforementioned shortcomings of insufficient dyeing, but rather yarns having a remarkably higher whiteness rating.

To apply and put into practice the conditions provided for by the present invention it is necessary to charge the reactor with at least 50–60% of the monomers with respect to the total weight of the mixture to be polymerized. Furthermore, when sodium allyl sulphonate is also present as a monomer, it is preferred that it be added to the other monomers which have been previously dissolved in dimethylformamide, in the form of dimethylformamide clear solutions. Said clear solutions are obtained by dissolving sodium allyl sulphonate in dimethylformamide, more precisely at about 50° C., so as to obtain a concentration of about 5%–6%. Said solution is then filtered and the filtrate is used as explained above. The thusly prepared mixture of dimethylformamide-dissolved monomers, possibly containing additives, is heated up to a temperature, more particularly 60° C., at which the reaction can be primed. According to a preferred embodiment of the invention, said temperature is attained by maintaining the reaction's surroundings under vacuum, more particularly at a residual pressure of 400 mms. Hg, at which, once the temperature of 60° C. has been reached, the phenomenon of ebullition of said mixture takes place, whereafter, once said conditions are reached, the catalyst is introduced in the heated mass, while simultaneously discontinuing the heating.

On account of the previously reached temperature, the reaction starts immediately. The heat evolved from the reaction, however, cannot raise the temperature of the mass any further, as said heat is absorbed by the change of state of the mixture components, which takes place at the barometric pressure indicated above. Said components, on evaporation, are condensed outside the reactor and refluxed, when cooled off, in the reactor.

It is apparent that, since low-boiling components are present in the mixture, the percentage ratios of the components vary throughout the reaction run.

It has been ascertained, however, that, by keeping the reactor's atmosphere at the above suggested pressure of 400 mms. Hg the temperature gradient of the mass is not greater than five degrees centigrade; and thus the whole reaction run takes place at a temperature ranging between 60° C. and 65° C., that is, in conditions of regular evolution of the conversion with a progression which is predetermined in time, thus reserving the possibility of discontinuing the polymerization process after a certain predetermined time of the reaction. Solutions are thereby obtained in which a precisely determined percentage of monomers is converted.

According to the aforementioned modification of the invention the polymerization is carried out at least in two successive stages, under controlled temperature conditions, by associating with the monomers to be polymerized the amounts of solvent, dimethylformamide in the case in point, and of catalyst, dividing them into increments during successive periods. Thus in the initial stage of the processing run, the advantages attendant on a polymerization carried out under regular and controlled conditions are attained, and a monomer conversion of about 40% is achieved, whereas in the subsequent stage, the reaction is carried on with addition of the remainder fractions of solvent and catalyst until the desired rate of conversion is reached, usually in the order of 75%–80%. Then the polymerization velocity, which is then relatively low, permits determining with greater accuracy the instant and the conditions under which the process run is to be discontinued. Moreover, when mixtures are polymerized, which contain acrylonitrile and sodium allyl sulphonate, according to a preferred embodiment of the invention, the latter compound is charged in the reactor which already contains an acrylonitrile solution in dimethylformamide and possibly the other monomers and additives in the form of a clear solution in dimethylformamide. By so doing, sodium allyl sulphonate is perfectly dissolved in the mixture to be polymerized and the spinnable solutions which are obtained on completion of the polymerization are clear and homogeneous and thus the above-mentioned defects in spinning the obtained solution and in the final yarn are done away with.

To split up the polymerization run into two distinct stages has proven advantageous, the first stage, preferably charging the reactor with dimethylformamide on a weight basis about equal to the total weight of the charged monomers, being carried out essentially under the aforementioned conditions. When the desired conversion rate has been attained, generally in the order of 40%, the remaining fraction of dimethylformamide (normally in an amount about one half of the initially charged total mass) and of catalyst (this can be determined by trial and error) is added until the desired conversion rate is reached.

By so operating, the temperature of the reacting mass is very conveniently controlled. The additions of catalyst prime the reaction and the latter, being exothermic, gives rise to heat build up. On account of the change of physical state of the mixture, which takes place under the cited vacuum conditions, the temperature of the mixture remains virtually constant.

As the subsequent addition of a high-boiling substance, i.e. dimethylformamide, causes the boiling point of the mixture to rise, the degree of vacuum is increased at the outset of the second stage and the pressure reigning within the reactor is lowered to about 230–220 mm. Hg of residual pressure.

As the conversion of the monomers proceeds, a slight rise in temperature of the mass occurs, a rise which however is confined within very narrow limits, in the order of 3° C. or 4° C., takes place and the reaction is carried on under perfectly controlled conditions and can be discontinued easily when the desired conversion rate value is attained, preferably in the order of 75%–80%.

This stoppage of the reaction can be brought about in several ways. Preferably a sudden increase of the degree of vacuum is caused, proceeding immediately after with the distillation in a vacuo, in practice at economically acceptable values. Said distillation is carried on until pure dimethylformamide is distilled. The technical condition is particularly favorable in that the polymer or copolymer remains dissolved in the mass at the concentration which is the most favorable to the employment of dimethylformamide, i.e. in the order of 20% approx. (in dimethylformamide).

It is apparent from the foregoing that high rates of conversion can be advantageously achieved. In addition to the self-explanatory advantages in terms of time and cost stemming from the reduction of the amounts of non-converted monomers which could previously only be recovered by time-consuming distillation processes, said high conversion rate values have an important effect on the affinity of the fibre or yarn towards substantive dyes.

The mode of putting the process of the invention into practice will be better understood from the following disclosure of typical embodiments of the invention.

EXAMPLE 1

A two-liter, four-necked glass reactor fitted with two-pronged stirrer, thermometer, reflux condenser and nitrogen intake tube, and in which a thermostat is installed, is charged with:

|  | Grs. |
|---|---|
| (a) Dimethylformamide | 605 |
| (b) Sodium allyl sulphonate | 3.25 |
| (c) Distilled acrylonitrile | 590 |
| (d) Distilled methylmetacrylate | 15 |

Said reactor, before being charged with the above listed substances, is scavenged with a nitrogen stream which is continually fed, but more slowly than before, on completion of the charge and throughout the whole polymerization time. The mass is then maintained under a gentle stirring until its temperature reaches 58° C.

At this stage, the peroxide catalyst is introduced, more particularly 2.8 grs. of lauroyl peroxide. Preferably said peroxide is previously dissolved in 50 grs. of dimethylformamide at 50° C., which, in the weight reckoning of the aforementioned charge, are an integral part of said 605 grs. as charged at the outset.

The reactor is thus charged, in total, with 1216 grs. of substances, in which the monomer percentage is as high as 50%. Said percentage could even be higher, up to 60%, by suitably dosing the initial charge.

After 20 mins. treatment, the internal temperature has risen to 61° C., this fact being an indication that the polymerization priming has taken place.

After 20 additional minutes, the temperature has further risen to 62° C. and the mass is wholly muddy.

After 4 hours of polymerization time in total, during which time, by a suitable adjustment of the stirrer the internal temperature is maintained within the range from 60° C. and 65° C., the mass has a doughy and thick consistency and tends to jam the stirrer.

This mass is composed, approximately, of 15% of polymer, 35% of monomers and 50% of dimethylformamide.

At this point 550 additional grams of cold dimethylformamide are added, which stop polymerization, thus permitting the stirrer operation to be resumed again so as to go on under efficient and regular stirring conditions.

After about one hour, all the lumps in the mass, kept under maximum stirring conditions, are dispersed and broken away and a fluid, homogeneous easily distillable mass is obtained, of a total weight of 1766 grs., which consists of 11.5% approx. of polymer, 22.5% of monomers, and 66% dimethylformamide.

Said mass is distilled in a vacuo at 60° C. in order to remove and recover the unreacted acrylonitrile and methylmetacrylate. Said monomers are completely removed after 2-hour distillation and 1250 grs. of a 16.5% copolymer solution are obtained. Said solution is clear and has a citrine yellow shade, i.e. it is clearer than the solutions obtained with the prior art processes and is thus adapted to the production of yarns having improved whiteness characteristics.

Two hundred and one (201) grs. of copolymer are obtained, thus showing that the monomer conversion has been confined within the boundaries of 33% approx. The average molecular weight of the polymer thus obtained has been found to be 65,000.

Yarns, exhibiting a satisfactory degree of optical bleaching can be obtained from said polymer.

It is apparent that the process according to the invention can be put into practice by using other means and implementations, provided that the procedure is carried out essentially in the conditions specified above and more particularly as defined hereinafter and without departing from the scope of the present invention.

From the foregoing, it can be easily appreciated that the improved process according to the invention permits obtaining a polymer which, on account of its suitable average molecular weight and of it whiteness rating, has properties that are particularly suitable for spinning, all this in a relatively short time (in the order of 4 hrs.), which would not have been possible with prior known methods.

It can be observed, in addition, that by operating at lower temperatures and lower monomer concentrations, much longer time will be required in order to obtain molecular weights suitable for the production of yarns. For example, by operating at temperatures in the order of 45/50° C., the process would take about 48 hours.

EXAMPLE 2

A two-liter, four-necked glass reactor, equipped with a two-pronged stirrer, thermometer, reflux condenser, nitrogen intake tube, and placed in a water thermostat at 65° C., is charged, in the order given with two separate compositions; viz.:

(1) A mixture consisting of:
   454 grs. distilled dimethylformamide
   590 grs. distilled acrylonitrile
   15 grs. distilled methylmetacrylate
   0.12 grs. thiourea-dioxide
(2) 108 grs. of a 6% solution of sodium allyl sulphonate in dimethylformamide, prepared hot and filtered.

The mass is kept under slow stirring and heated, by applying to the surroundings a vacuum of 360 mms. Hg until an internal temperature of 60° C. is reached. At this stage 2.8 grs. of lauroylperoxide, dissolved in 50 grs. dimethylformamide at 60° C. are charged, while heating is discontinued. After 20 mins. the internal temperature begins to rise a few degrees, indicating that polymerization is being primed.

Polymerization is carried out for 4 hours, with continuous stirrings. During this time the internal temperature does not exceed 60–65° C., and the components of the boiling mixture are condensed and refluxed, as they have cooled off, in the reactor. At this stage 550 grs. dimethylformamide are added, while keeping the mixture under energetic stirring for an hour, until an easily distillable fluid and homogeneous mixture is obtained, from which, by distillation under vacuum, the unpolymerized monomers are driven off thus getting the desired clear copolymer solution ready for spinning.

The solution thus obtained weighs 1145 grs. and contains 17.96% of solids, corresponding to about 205 grs. of copolymer. It can thus be appreciated that the conversion rate of the charged monomers has been 33.4%. The polymer, as analyzed, has shown the presence of 1.5% of sodium allyl sulphonate, this amount having proven to be substantially constant throughout a repeated number of tests. The analyzed polymer shows a nitrogen content of 23.53%, corresponding to 89% polyacrylonitrile. Its average molecular weight, calculated according to known methods, more particularly according to the method described in the U.S. Patent No. 2,404,713, has been ascertained to be as high as 60,000.

As an evidence of the constancy of production, the corresponding quantitative and analytical data are reported, obtained from another test, as compared with those given in the foregoing. In said other test, repeated under very much the same conditions, there have been obtained 1160 grs. of a solution with 17% solids, corresponding to 197 grs. of copolymer with a conversion rate of 32.2%

The analyzed copolymer has shown the presence of 1.6% of sodium allyl sulphonate, that is, within the above indicated critical limits in order to ensure conversions with the best textile and tinctorial characteristics. As analyzed, this latter solution has a nitrogen content of 25.53% along with a molecular weight of 61,000.

Example 3

By adopting the same procedure as in Example 2, the reactor is charged, in the order given with two separated composition, viz.:

(1) a mixture composed of:
    454 grs. of distilled dimethylformamide
    590 grs. distilled acrylonitrile
    32 grs. ethyl acrylate
    0.12 gr. thiourea dioxide
(2) 108 grs. of a 6% solution of sodium allyl sulphonate in dimethyl formamide, prepared hot and filtered, the polymerization being carried out under the conditions specified in Example 2, with the exception that vacuum is not resorted to in order to keep the reaction temperature at the constant desired value.

Polymerization is carried on for 4 hours with continuous stirring so that the internal temperature may not exceed 60° C.–65° C.

At this stage, 550 grs. dimethylformamide are added, while energetically stirring the mixture for 1 hr. until an easily distillable fluid homogeneous mixture is obtained from which the unpolymerized monomers are removed by distillation under vacuum. 1180 grs. of a solution containing 18% solids (corresponding to 212 grs. of copolymer) are obtained.

A conversion rate of 33.8% of the charged monomer has thus been obtained. The copolymer has shown the presence of 1.45% of sodium allyl sulphonate and a nitrogen content of 23.7%, its molecular weight being 62,300.

Example 4

The procedure is the one of Example 2, two separate compositions being charged in the order given, viz.:

(1) A mixture consisting of:
    454 grs. distilled dimethylformamide
    590 grs. distilled acrylonitrile
    32 grs. methyl acrylate
    0.12 gr. thiourea dioxide
(2) One-hundred and eight (108) grs. of a 6% solution of sodium allyl sulphonate in dimethylformamide, prepared hot and filtered.

Polymerization is proceeded with as disclosed in Example 2.

Upon addition of 550 grs. of dimethylformamide and distillation of the unpolymerized monomers there are obtained 1210 grs. of a viscous solution containing 18.1% solids, corresponding to 219 grs. of copolymer. The rate of conversion was 34.9% of the charged monomers. The copolymer contains 1.5% of sodium allyl sulphonate, a nitrogen percentage of 23.6%, and has a molecular weight of 64,300.

Example 5

A two-liter, four necked glass reactor, previously scavenged with nitrogen and equipped with stirrer, thermometer, reflux condenser, nitrogen intake tube and thermostat is charged with:

| | Grs. |
|---|---|
| Distilled dimethylformamide | 277 |
| Sodium allyl sulphonate | 3.5 |
| Distilled acrylonitrile | 295 |
| Methylmetacrylate | 7.5 |
| Thiourea dioxide | 0.06 |

The reagent's mass is then heated up to a temperature of about 58° C. At this stage a solution of 1.4 grs. lauroyl peroxide in 25 grs. dimethylformamide is added as the catalyst. The reaction being thus primed, the temperature rises up to 61° C.–62° C. with 15 mins. The polymerization is carried on with suitable stirring at a temperature of 60° C.–64° C. for 4 hours.

At this stage the mass thickens and a solution of 2.5 grs. methyl metacrylate and 0.5 grs. lauroyl peroxide in 275 grs. dimethylformamide is added. The mass is continually stirred until it becomes fluid again while the temperature rises up to 70° C. The reaction goes on regularly under controlled temperature conditions until a total monomer conversion rate of 70% is achieved. Distillation under vacuum of the reaction mass containing the unreacted monomers is immediately proceeded with, and the distillation is continued until dimethylformamide only is distilled.

To the thus obtained viscous solution, an amount of dimethylformamide is added so as to obtain a spinnable solution containing 19% of copolymer. Said solution is clear and transparent and originates yarns having a satisfactory whiteness rating along with good textile and tinctorial properties. The copolymer's molecular weight averages 55,000.

Example 6

A three-liter, four-necked glass flask, equipped with stirrer, thermometer, reflux condenser, nitrogen intake tube and thermostat is charged, in the order given, with two separate compositions, viz.:

No. (1):
    404 grs. distilled dimethylformamide
    590 grs. distilled acrylonitrile
    32 grs. ethyl acrylate
    0.12 gr. thiourea dioxide
(2) 158 grs. of 6% solution of sodium allyl sulphonate in a dimethylformamide prepared hot and filtered.

Polymerization is proceeded with as outlined in Example 5; and to the mass heated at about 58° C. there is added a solution of 2.8 grs. lauroyl peroxide dissolved in 50 grs. dimethylformamide. The temperature of the mass under reaction rises to 61° C.–62° C. within 20 mins. and the polymerization is carried ahead for 4 additional hours. At this stage a solution is added, consisting of 1 gr. lauroyl peroxide dissolved in 550 grs. dimethylformamide. The mass is continually stirred until a monomer conversion rate of about 70% is obtained. Upon distilling off the unreacted monomers, an amount of dimethylformamide is added to the obtained mass so as to obtain a spinnable viscous solution containing 20% of copolymer and having a clear color. The copolymer has a molecular weight of 53,000 and analyses 1.5% sodium allyl sulphonate and 23.8% nitrogen. The obtained yarns have a satisfactory whiteness rating and are endowed with very valuable and constant textile and tinctorial properties.

Example 7

A 2,300-liter autoclave, equipped with a jacket for circulating a heating fluid, a stirrer and a system capable of condensing the vapours and refluxing them into the reacting mass, is used. The autoclave is allowed to operate both under vacuum and at ambient pressure.

Said autoclave is charged with:

950 kgs. of a mixture of acrylonitrile and of dimethylformamide containing 57% acrylonitrile
13.1 kgs. methylmetacrylate
4.83 kgs. sodium allyl sulphonate The mass is heated to 60° C. while applying a vacuum of 400 mms. Hg (millimeters of mercury) of residual pressure, whereafter 2.6 kgs. lauroyl peroxide are added as the catalyst and the polymerization is carried on for 2½ hours. The distilled vapours are condensed and refluxed into the reaction mass. At the end of this time the conversion of the monomers has reached about 40%. Then, to the reaction mass is added a solution consisting of 11.5 kgs. methylmetacrylate, 1 kg. lauroyl peroxide and 566 kgs. dimethylformamide. This second polymerization stage is carried out at 65° C. under a vacuum of 220–230 mms. Hg of residual pressure for 6 hours. On completion, the unreacted monomers are distilled off and a dimethylformamide solution of the copolymer is directly obtained, which is ready for being spun. This solution has a clear color, a viscosity rating of 40 poises and a content of solids (copolymer) of 21%, which corresponds to a monomer conversion rate of 75%. The produced copolymer has a molecular weight of 50,000.

Yarns manufactured with this solution have good textile and tinctorial properties and a satisfactory whiteness rating.

Having thus described our invention, what we claim is:

1. A process for producing a spinnable solution of a polymer of acrylonitrile having a polyacrylonitrile content of more than 85% by weight, which comprises polymerizing a monomer mixture containing acryonitrile, comprising the steps of
   dissolving the monomeric mixture in dimethylformamide, with the monomers constituting between 50 and 60 percent by weight of the solution;
   heating the dissolved monomers to between 60° C. and 65° C. under subatmospheric pressure of between 360 and 400 mm. of mercury to maintain said temperature;
   adding a peroxide catalyst to the heated solution;
   discontinuing polymerization when conversion of 30 to 40 of the monomers is attained; and
   distilling-off unconverted monomers to provide a spinnable solution of an acrylonitrile-based copolymer whose molecular weight is between 60,000 and 65,000.

2. The process defined in claim 1, wherein the said solution is heated at approximately 60° C. under subatmospheric pressure and the said polymerization is promoted by adding the catalyst to the heated solution, and discontinuing the heating when said catalyst is added.

3. A process according to claim 2, wherein the starting mixture comprises acrylonitrile, methyl methacrylate and sodium allyl sulphonate, the last-named substance being added to the other components of the reaction mass in the form of a clear solution in dimethylformamide in a concentration ranging from 4% to 6%.

4. The process defined in claim 3, wherein the catalyst is lauroyl peroxide and is previously dissolved in dimethylformamide.

5. A process for producing a spinnable solution of a polymer of acrylonitrile having a polyacrylonitrile content of more than 85% by weight, which comprises polymerizing a monomeric mixture containing acrylonitrile, comprising the steps of:
   dissolving the monomeric mixture in dimethylformamide with the monomers constituting between 50% and 60% by weight of the solution;
   heating the dissolved monomers to between 60° C. and 65° C. under a subatmospheric pressure of between 360 and 400 mm. of mercury to maintain said temperature,
   adding a peroxide catalyst to the heated solution to promote a first stage of polymerization,
   continuing said first stage polymerization until about 40 percent conversion is attained;
   adding further dimethylformamide in an amount about equal to half of the initially charged total mass, and further catalyst, to expedite further polymerization in a second stage; and
   subjecting the resulting mass to a second subatmospheric pressure in the order of 220 to 330 mm. Hg; and
   continuing said further polymerization until a conversion of the order of 70 to 75 percent is attained to provide an acrylonitrile based polymeric material of improved spinable properties and of an average molecular weight of about 50,000 to 55,000.

6. The process defined in claim 5, wherein said first stage of polymerization is continued under a controlled temperature of about 61 to 62° C., and the said further, second-stage polymerization is continued under a controlled temperature of 65 to 70° C.

7. The process defined in claim 5, wherein the dimethylformamide solution of the first stage monomer mixture contains more than 85% acrylonitrile, at least one other monomer, and sodium allyl sulphonate, and the sodium allyl sulphonate is added to the other components of the first stage reaction mass in the form of a clear solution in dimethylformamide.

8. The process defined in claim 5, wherein the polyerization process is discontinued, upon completion of the final stage, by applying a high degree of vacuum while distilling off the unreacted monomers.

9. The process defined in claim 8, wherein the distillation is carried on until pure dimethylformamide only is distilled.

No references cited.

MORRIS LIEBMAN, *Primary Examiner.*

H. S. KAPLAN, *Examiner.*